United States Patent Office 3,549,698
Patented Dec. 22, 1970

3,549,698
FLUOROALKYL GEM-DIOLS
Ralph I. Coon, St. Paul, Minn., assignor to Minnesota Mining and Manufacturing Company, St. Paul, Minn., a corporation of Delaware
No Drawing. Continuation-in-part of application Ser. No. 449,269, Apr. 19, 1965, and a division of application Ser. No. 679,160, Oct. 30, 1967. This application Dec. 13, 1968, Ser. No. 783,753
Int. Cl. C07c 59/10
U.S. Cl. 260—535                                    3 Claims

ABSTRACT OF THE DISCLOSURE

Fluoroalkyl gem-diols and their derivatives in which the alkyl group has 3 to 20 carbon atoms are formed by treating a 1,2-epoxy perfluoroalkane with water to produce alpha-alpha-dihydroxy perfluoroalkane carboxylic acids, which are then converted to amides, esters, and numerous other carbonyl-derived derivatives. The compounds have useful properties based upon the combination of the gem-diol group and their fluorine content, e.g. as surfactants.

CROSS-REFERENCE TO RELATED APPLICATIONS

This application is a continuation-in-part and division respectively of prior copending applications Ser. No. 449,269, filed Apr. 19, 1965, now abandoned, and Ser. No. 679,160, filed Oct. 30, 1967, now abandoned.

BACKGROUND OF THE INVENTION

This application relates to fluorinated compounds and more particularly to certain fluoroalkyl gem-diols including alpha-alpha-dihydroxy fluoroalkane carboxylic acids and their carbonyl-derived derivatives.

Perfluoropyruvic acid and certain of its derivatives are described in U.S. Pat. 3,321,517, and hydroxy acids are disclosed in U.S. Pat. 3,202,706 and gem-diols in U.S. Pat. 3,227,674. However, so far as is known, the fluoroalkyl gem-diols and their derivatives as claimed herein have not been known heretofore.

SUMMARY OF THE INVENTION

The invention pertains to certain fluorinated carboxylic acids and their carbonyl-derived derivatives, which contain three or more fully fluorinated carbon atoms and have two hydroxyl groups attached to the carbon atom adjacent to the carbonyl or derivative group.

The gem-diols of the invention when in acid form can be represented by the formula

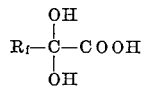

in which $R_f$ is a perfluoroalkyl group having from 3 to 20 carbon atoms, from 3 to 12 carbon atoms being preferred.

These acids are water-soluble and useful for their acidic properties, being relatively strong acids. They can be used as a starting material for further reaction to produce other carbon-fluorine containing compounds. They form salts with metals and ammonia as by neutralization with a base. Their alkali-metal salts are water-soluble and can be used as emulsifying agents, particularly for use in systems where fluorinated compounds are present. Thus they can be used in wax emulsions, such as floor wax and the like.

Further, by dehydration, acids having the formula

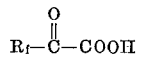

wherein $R_f$ has the same significance as before, are produced. These keto acids are useful for surfactants and emulsifiers, as in non-aqueous polishing wax emulsions. The acids are also chemical intermediates, from which esters, amidine, nitriles, hydrazides and the like can be prepared by reaction with the carboxyl group. When treated with water, the dihydroxy acid or acid derivative is reformed.

In preparing the compounds of the invention, a 1,2-epoxy perfluoroalkane is employed as a starting material. The 1,2-epoxy perfluoroalkane contains at least 3 carbon atoms, and preferably 5 or more, with a distal $CF_3$ group. Product compounds containing more than about 20 carbon atoms offer no significant advantage in properties over the shorter-chained acids, and the starting materials are difficult to obtain and are more expensive than the preferred 1,2-epoxides containing 3 to about 20 carbon atoms.

The selected starting epoxide is treated with water at temperatures of the order of 100 to 200° C., and preferably 120 to 150° C., using closed vessels equipped to withstand the pressure. A molar excess of water is used, e.g. from 2 to 5 moles of water per mole of starting epoxide. The treatment at the temperatures indicated is continued for a period ranging from 30 minutes up to 24 hours or more, the shorter times being used with the higher temperatures and the longer times being used with the lower temperatures.

The perfluoroalkane epoxides employed as starting materials are obtained by treating the corresponding perfluoroolefins (such as those disclosed in U.S. Pat. 2,668,-864) with alkaline aqueous hydrogen peroxide. The procedure is as follows:

A mixture containing 3 moles of 35 percent aqueous hydrogen peroxide for each mole of the selected 1,2-perfluoroalkene is stirred thoroughly while incrementally adding 1 mole of sodium carbonate for each mole of the perfluoroalkene, as a 10 percent aqueous solution. The reaction is exothermic and cooling means, agitation, and a suitable condenser are provided. The rate of addition of the alkali is adjusted for control of the reaction. The temperature of the aqueous layer is maintained below about 60° C., preferably below about 50° C. After all of the alkali is added, the fluorocarbon layer is separated and dried, e.g. over phosphorus pentoxide, and filtered. Any unreacted perfluoroalkene is removed by slowly adding bromine to the solution at room temperature, while irradiating with ultraviolet light, until the color of bromine persists. The mixture is then fractionally distilled to separate the fluoroalkyl epoxide from the fluoroalkyl dibromide.

The following examples will more specifically illustrate the compounds of the invention and the process for their production. All parts are by weight unless otherwise specified.

EXAMPLE 1

A glass ampoule is charged with 2.5 parts of 1,2-epoxy perfluoroheptane and 0.3 part of water. The ampoule is sealed, placed in a shaking autoclave and heated at 150° C. for about 20 hours. The ampoule is then cooled, opened and the white solid contained therein is removed, washed with water and dried. 2.2 parts of the white, solid product, consisting of alpha,alpha-dihydroxy perfluoroheptanoic acid, are obtained. The acid softens at about 50° C. with formation of bubbles, indicating dehydration is taking place. Decomposition of the dehydrated product, the alpha-keto perfluoroheptanoic acid, take place in the range of 80 to 115° C.

The sodium salt of the dihydroxy perfluoroheptanoic acid thus formed is obtained by neutralizing an aqueous solution of the acid to pH 7 with 1 N sodium carbonate solution. Evaporation of the solution in a vacuum oven at about 50° C. yields the sodium salt as a white powder.

To dehydrate the dihydroxy acid, a portion of the acid obtained above is placed in a glass container provided with a heating mantle and vacuum connection. While maintaining the vessel at approximately 1 mm. Hg pressure, the acid is gently heated at about 60° C. A white solid remains, consisting of alpha-keto perfluoroheptanoic acid.

EXAMPLE 2

A glass ampoule is charged with 50 parts of 1,2-epoxy perfluorodecane and 5.5 parts of water. The ampoule is sealed, placed in a rocking autoclave and heated at 140 to 155° C. for about 20 hours.

After cooling and opening the ampoule, the gaseous products formed in the reaction are removed by connecting the ampoule to a vacuum system and gently warming. The remaining substantially white solid is alpha,alpha-dihydroxy perfluorodecanoic acid.

The acid is dissolved in water, neutralized to pH 7 with 1 N sodium carbonate solution and the water is removed by evaporation in vacuum oven at 40–50° C. The sodium salt is obtained as a white powder.

The alpha,alpha-dihydroxy perfluorodecanoic acid is dehydrated to form alpha-keto perfluorodecanoic acid by the procedure set forth in Example 1.

In a similar way, starting with 1,2-epoxy perfluorododecane, 1,2-epoxy perfluorooctane and 1,2-epoxy perfluoropentane, using 3 moles of water for each mole of starting material, and heating as set forth above, there are obtained respectively, alpha,alpha-dihydroxy perfluorododecanoic acid, alpha,alpha-dihydroxy perfluorooctanoic acid and alpha,alpha-dihydroxy perfluoropentanoic acid. These, on dehydration, yield alpha-keto perfluorododecanoic acid, alpha-keto perfluorooctanoic acid and alpha-keto perfluoropentanoic acid, respectively.

The alpha,alpha-dihydroxy fluoroalkyl acids have been found to undergo many of the reactions characteristic of the known perfluoroalkyl carboxlic acids, providing that care is taken to avoid conditions which will result in dehydration to the keto acid, in cases where water would interfere with the reaction, and if dehydration conditions are used, to maintain temperatures and reaction condition which will avoid decomposition of the alpha-keto compound.

The acids and their derivatives can be characterized by the formula

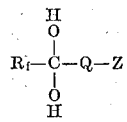

wherein $R_f$ is as defined above and when Q is

Z is —OH, —$M_{1/a}$, —OR, —NR'R'', M is $NH_4$ or a metal cation of valence $a$, R is alkyl, aryl, —CH=CR'R', alkoxy-alkyl, and R' is H, alkyl or aryl, R'' is H, alkyl, aryl or hydroxy alkyl; and when Q is —$CH_2$, Z is —OR',

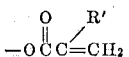

—NR'R'' and

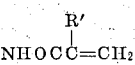

where R' and R'' are as hereinbefore. For convenience, these derivatives, including the polymers formed by polymerizing the vinyl-group-containing derivatives, can be referred to generally as carbonyl-derived derivatives.

The salts can be prepared by standard methods as exemplified, in solution or in solid form by evaporation of solvent at temperatures below about 60° C., if necessary under reduced pressure.

The methylester can be readily prepared by, for example, the conventional diazomethane reaction, preferably in ether solution at about room temperature. The other esters are suitably prepared by conventional ester exchange reactions using, for example, no solvent or an inert solvent such as diethyl ether or diglyme with a tetrabutyltitanate catalyst. Excess ester reactants and product acid can be removed by, for example, distillation at reduced pressure or by extraction with a cold hydrocarbon such as heptane, in which the dihydroxy ester is substantially insoluble but which has high solubility for the hydrocarbon compounds.

Amides, substituted or unsubstituted, can generally be prepared by reaction of the methyl ester in ether solution or without solvent by reaction at room temperature or below with ammonia or a substituted amine. Ammonia and the aliphatic primary and secondary amines are preferred since the aromatic amines tend to act only slowly.

1,1-dihydroamines,

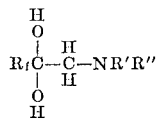

can be prepared by reduction of the corresponding amide

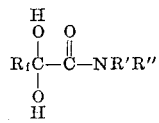

with Raney nickel and hydrogen in ether solution at temperatures of 20 to 40° C.

The acids can be converted to trihydric alcohol,

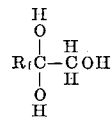

by reduction of the acid with sodium borohydride in diglyme or tetrahydrofuran solution at temperatures of about 30 to 40° C. The primary hydroxyl group is considerably more reactive than the secondary gem hydroxyl group. In transesterification, for example, the primary group reacts almost exclusively. Treatment of the alcohol with, for example, methyl acrylate or methyl methacrylate in presence of tetrabutyltitanate produces the dihydroxy acrylate or methacrylate ester,

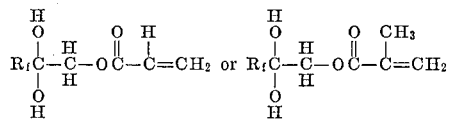

The alpha,alpha-dihydroxy acid salts are valuable surfactants. Where $R_f$ contains 3 or more carbon atoms, the materials will depress the surface tension of aqueous solutions and particularly in the case of the longer chain compounds, are sufficiently more water-soluble than the fluoroalkyl carboxylic acid derivatives to be preferable in such uses as leveling agents for latex paints, aqueous-based wax polish emulsions and the like.

The polymers and the copolymers prepared from the vinyl esters or the acrylates or methacrylates of 1,1-dihydro-2,2-dihydroxy fluoro-alcohols resemble in physical characteristics the corresponding polymers of the known fluoroalkyl acids and esters. The polymers are oil repellent and water repellent; however, the gem dihydroxy groups provide polar centers in the polymer which allows the polymer to be somewhat plasticized by low molecular weight polar molecules such as water, acetone, methanol and the like, thus providing softer polymers which are still not soluble in the presence of the plasticizing liquids. As surface treatments for fabrics, the acrylates and methacrylates produce a finish which has the desirable stain resistance of the previously known fluoroalkyl derivatives, but which generally has a softer and more pleasant hand.

What is claimed is:
1. A compound of the formula

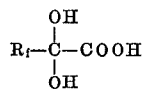

wherein $R_f$ is a perfluoroalkyl radical having from 3 to 20 carbon atoms.

2. Alpha,alpha-dihydoxy perfluoroheptanoic acid.
3. The sodium salt of alpha,alpha-dihydroxyperfluoroheptanic acid.

References Cited

UNITED STATES PATENTS 3,321,517  5/1967  Selman _____ 260—535X

FOREIGN PATENTS 1,485,419  5/1967  France _____ 260—535

LORRAINE A. WEINBERGER, Primary Examiner

P. J. KILLOS, Assistant Examiner

U.S. Cl. X.R.

204—163; 252—8.6, 356; 260—348, 348.5, 408, 465.7, 476, 479, 483, 484, 486, 539, 561, 562, 564, 569, 571, 573, 574, 576